(12) United States Patent
Giraudet et al.

(10) Patent No.: US 12,117,672 B2
(45) Date of Patent: Oct. 15, 2024

(54) OPHTHALMIC DEVICE WITH A BLINKING ILLUMINATING ELEMENT FOR REDUCING DYSLEXIA EFFECTS

(71) Applicant: Essilor International, Charenton-le-Pont (FR)

(72) Inventors: Guillaume Giraudet, Charenton-le-Pont (FR); Nicolas Lavillonniere, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 826 days.

(21) Appl. No.: 17/276,692

(22) PCT Filed: Sep. 19, 2019

(86) PCT No.: PCT/EP2019/075099
§ 371 (c)(1),
(2) Date: Mar. 16, 2021

(87) PCT Pub. No.: WO2020/064477
PCT Pub. Date: Apr. 2, 2020

(65) Prior Publication Data
US 2022/0026745 A1     Jan. 27, 2022

(30) Foreign Application Priority Data
Sep. 25, 2018  (EP) ..................... 18306242

(51) Int. Cl.
G02C 11/04     (2006.01)
G02C 7/10      (2006.01)

(52) U.S. Cl.
CPC .............. *G02C 11/04* (2013.01); *G02C 7/104* (2013.01); *G02C 2202/10* (2013.01)

(58) Field of Classification Search
CPC ..... G02C 11/04; G02C 7/104; G02C 2202/10; G02C 7/101; G02C 7/105
(Continued)

(56) References Cited

U.S. PATENT DOCUMENTS

| 5,440,359 A | 8/1995 | Bloch-Malem |
| 2003/0223036 A1 | 12/2003 | Anderson et al. |

(Continued)

FOREIGN PATENT DOCUMENTS

| CN | 202199129 U | 4/2012 |
| CN | 203311115 U | 11/2013 |

(Continued)

OTHER PUBLICATIONS

Korean Office Action issued on Aug. 22, 2022 in Korean Patent Application No. 10-2021-7006652 (with English translation), 12 pages.

(Continued)

*Primary Examiner* — Tuyen Tra
(74) *Attorney, Agent, or Firm* — Oblon, McClelland, Maier & Neustadt, L.L.P.

(57) ABSTRACT

An ophthalmic device for reducing dyslexia effects for a wearer including a frame intended to be worn by the wearer and a blinking illuminating element coupled to the frame comprising at least one light source configured to emit light in front of the wearer's head so as to lighten a medium observed by the wearer, said at least one light source being configured to be successively switched on and switched off at a predetermined frequency when the blinking illuminating element is activated.

17 Claims, 1 Drawing Sheet

Figure 1:
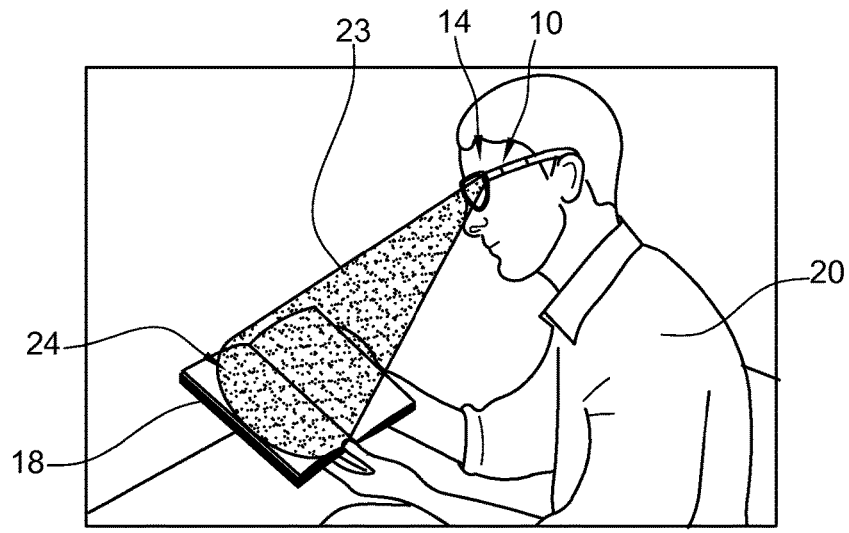

(58) Field of Classification Search
USPC .................................................. 351/41, 158
See application file for complete search history.

(56) References Cited

U.S. PATENT DOCUMENTS

| | | |
|---|---|---|
| 2005/0175969 A1 | 8/2005 | Hayes |
| 2007/0200998 A1 | 8/2007 | Schrimmer et al. |
| 2009/0015786 A1 | 1/2009 | Harris |
| 2010/0060850 A1 | 3/2010 | Giraudet |
| 2011/0187989 A1 | 8/2011 | Waters |
| 2012/0273110 A1 | 11/2012 | Harris |
| 2014/0022765 A1 | 1/2014 | Waters |
| 2014/0268018 A1 | 9/2014 | Santarelli |
| 2014/0336723 A1 | 11/2014 | Ben-Ezra et al. |

FOREIGN PATENT DOCUMENTS

| | | |
|---|---|---|
| CN | 104169784 A | 11/2014 |
| CN | 107174495 A | 9/2017 |
| EP | 2 534 531 A1 | 12/2012 |
| EP | 2 590 008 A1 | 5/2013 |
| GB | 2 266 786 A | 11/1993 |
| JP | 2010-503029 A | 1/2010 |
| JP | 2010-537380 A | 12/2010 |
| JP | 2012-215808 A | 11/2012 |
| JP | 3190587 U | 4/2014 |
| JP | 2016-161807 A | 9/2016 |
| KR | 10-2016-0081846 A | 7/2016 |
| WO | WO 2011/100471 A1 | 8/2011 |
| WO | WO 2013/074232 A1 | 5/2013 |
| WO | WO 2018/043975 A1 | 3/2018 |

OTHER PUBLICATIONS

Combined Chinese Office Action and Search Report issued Jun. 10, 2022 in Chinese Patent Application No. 201980062984.7 (submitting English translation only), 7 pages.

International Search Report issued Dec. 5, 2019 in PCT/EP2019/075099 filed Sep. 19, 2019.

Extended European Search Report issued Apr. 16, 2019 in Europe Patent Application No. 18306242.1 filed Sep. 25, 2018.

Le Floch, A., et al., "Left—right asymmetry of the Maxwell spot centroids in adults without and with dyslexia", The Royal Society Publishing, vol. 284, XP055573229, 2017, pp. 1-10.

Japanese Office Action issued Apr. 10, 2023 in Japanese Patent Application No. 2021-515476 (with English Translation), 9 pages.

OPHTHALMIC DEVICE WITH A BLINKING ILLUMINATING ELEMENT FOR REDUCING DYSLEXIA EFFECTS

The invention concerns an ophthalmic device for reducing dyslexia effects. Particularly, the invention concerns an ophthalmic device with a blinking illuminating element for reducing dyslexia effects.

Developmental dyslexia is defined as a lasting difficulty with learning written language in spite of normal intellectual abilities, an absence of psychiatric or neurological disorders, a normally stimulating socio-cultural environment and appropriate schooling. This difficulty reflects a malfunction of the cognitive system responsible for reading. Dyslexia affects 8 to 10% of schoolchildren and persists throughout the individual's life, despite normal motivation. Developmental dyslexias must be distinguished from acquired dyslexias which result from cerebral lesions. Most people with dyslexia often make the same kind of mistakes: they confuse morphologically similar letters (such as p and q, b and d) and make visual mistakes with words. They have difficulty in grasping whole words and often overcome their problems with deciphering by guessing words rather than really reading them. They also experience difficulty with graphophonemic rules (in particular for complex sets of letters) often leading them to reverse letters, or even syllables. Dyslexia is sometimes accompanied by other disorders such as oral language (dysphasia), written language (dysorthographia), short-term memory, motor coordination, or also visuospatial processing disorders. Dyscalculia or attention deficit hyperactivity disorder may also be included. Dyslexia must therefore be considered as an overall learning dysfunction.

Many ophthalmic devices, particularly glasses, have been developed to help dyslexic wearers to improve their reading skills. The most known technique consists in providing glasses worn by the wearer with ophthalmic lenses having coloured filters. Particularly, documents US 2010/060850 A1, U.S. Pat. No. 5,440,359 or GB 2 266 786 A disclose coloured filters provided on specific areas of the ophthalmic lenses to treat dyslexia or reading disorders.

However, it has been recently observed that a cause for dyslexia troubles may come from a lack of asymmetry between the two Maxwell centroids of the subject, one in each retina (Le Floch A, Ropars G., 2017. Left-right asymmetry of the Maxwell spot centroids in adults without and with dyslexia. Proc. R. Soc. B 284: 20171380). The Maxwell centroid is also called the fovea center or the blue scotomae. Healthy subjects have an asymmetry in their two Maxwell centroids. This asymmetry allows healthy subjects to have a dominant eye to allow their brain to process only the image seen by the dominant eye when reading. The symmetry which has been observed for subjects with this kind of dyslexia prevents the subject to develop a dominant eye and thereby has a direct impact on the way the brain processes the images simultaneously perceived by the two eyes. Hence, the brain is unable to select which image to process between the two eyes, resulting in a confusion between mirror images like «b» and «d».

It has been also observed in this scientific publication that exposing with blinking light a medium observed by the subject onto which characters are written improves the reading skills of the subject. This blinking light is provided by a static and heavy laboratory power controller configured for experimental trials. The laboratory power controller is intended to be stationary. Indeed, this laboratory power controller is bulky and difficult to move so that a regular and practical use is difficult to be considered.

A problem that the invention aims to solve is thus to provide a portable ophthalmic device able to reduce dyslexia effects of a subject.

To solve this problem, the invention provides an ophthalmic device for reducing dyslexia effects for a wearer, comprising:
 a frame intended to be worn by the wearer,
 a blinking illuminating element coupled to the frame comprising at least one light source configured to emit light in front of the wearer's head so as to lighten a medium observed by the wearer, said at least one light source being configured to be successively switched on and switched off at a predetermined frequency when the blinking illuminating element is activated.

The wearable configuration of the ophthalmic device enables easy handling of the device and allows the subject to have a practical solution always available to reduce dyslexia effects. Providing an ophthalmic device which is easy to transport and practical make it easier to use regularly. Said device may thus be used by the subject himself at home or in various conditions.

According to an embodiment of the ophthalmic device, it further comprises a selective activating member configured to selectively activate the blinking illuminating element.

According to an embodiment of the ophthalmic device, the selective activating member comprises at least one among:
 a switch disposed onto the frame and configured to activate the blinking illuminating element on demand.
 a controlling terminal configured to remotely activate the blinking illuminating element.

According to an embodiment of the ophthalmic device, it further comprises an automatic activating member comprising a sensing member configured to detect a reading situation for the wearer and to activate the blinking illuminating element when a reading situation is detected.

According to an embodiment of the ophthalmic device, the sensing member comprises one or more among an accelerometer, an eye-tracking device, a gyroscope and a telemeter to detect a movement or a position of the wearer representative of a reading setting-up of the wearer.

According to an embodiment of the ophthalmic device, said predetermined frequency is at least 50 Hz, preferably at least 70 Hz.

According to an embodiment of the ophthalmic device, said frame forms a frame of eyeglasses and defines two orifices configured to each receive a lens therein, wherein said at least one light source is disposed in an upper portion of the frame between the two orifices and/or at the periphery of one among said two orifices.

According to an embodiment of the ophthalmic device, said at least one light source is configured to selectively provide different light emission spectrums.

According to an embodiment of the ophthalmic device, it further comprises a color selection switch comprising a plurality of positions each corresponding to a specific color of the light emitted by said at least one light source.

According to an embodiment of the ophthalmic device, said blinking illuminating element is configured to focus light emitted by said at least one light source toward a medium observed by the wearer with one among:
 a converging lens disposed in front of said at least one light source, or
 a concentrating grid in front of said at least one light source to provide a collimated light.

According to an embodiment of the ophthalmic device, it further comprises:

two lenses coupled to the frame and configured to be each disposed in front of an eye of the wearer, a color filter applied to one of said two lenses and configured to absorb a specific light wavelength range.

According to an embodiment of the ophthalmic device, said color filter is configured to absorb light having a wavelength between 390 nm and 790 nm, preferably between 390 and 490 nm.

According to an embodiment of the ophthalmic device, said color filter is applied to only a predetermined portion of the lens used by the wearer in a reading situation.

According to an embodiment of the ophthalmic device, said color filter is configured to be selectively actuated.

The invention also refers to a method for manufacturing an ophthalmic device for reducing dyslexia effects for a wearer, providing a frame intended to be worn by the wearer, providing a blinking illuminating element comprising at least one light source configured to emit light in front of the wearer's head so as to lighten a medium observed by the wearer, said at least one light source being configured to be successively switched on and switched off at a predetermined frequency when the blinking illuminating element is activated coupling the blinking illuminating element to the frame.

The invention is described in more detail below by way of the figures that show preferred embodiments of the invention.

FIG. 1 schematically shows an ophthalmic device worn by a wearer in reading situation, the ophthalmic device providing light to a medium read by the wearer.

Figure 2:
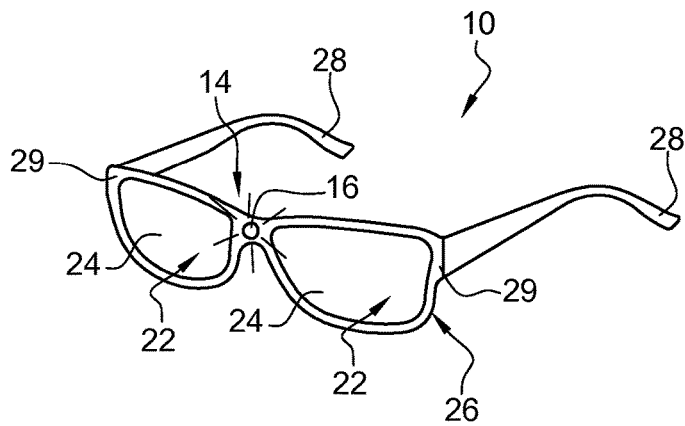

FIG. 2 schematically shows a perspective view of an embodiment of the ophthalmic device of FIG. 1.

Figures 3, 4:
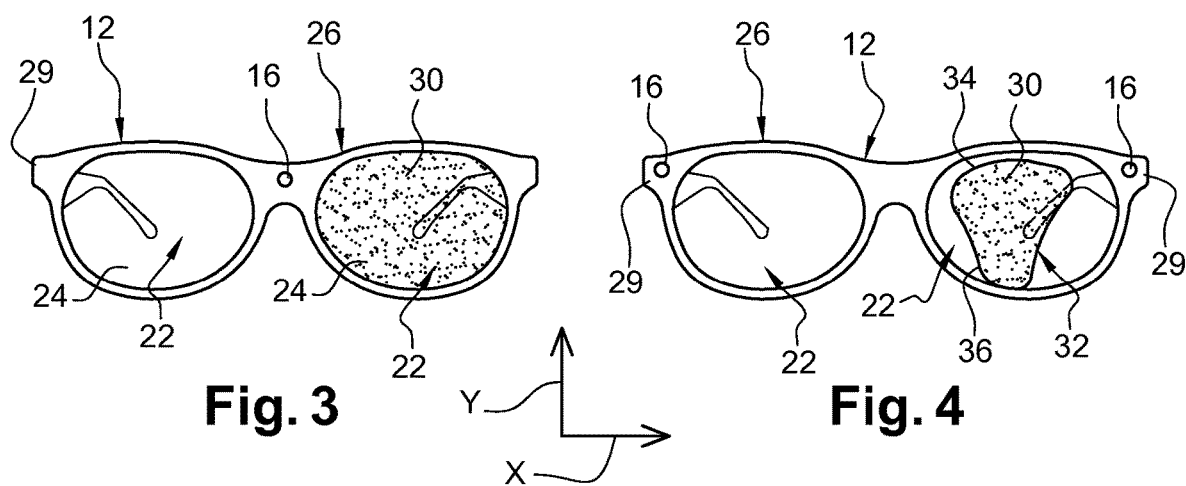

FIGS. 3 and 4 schematically show perspective frontal views of two other embodiments of the ophthalmic device of FIG. 1.

As shown on FIG. 1, an ophthalmic device 10 is provided for reducing dyslexia effects for a wearer 20. Particularly, said ophthalmic device 10 is configured to reduce effects of developmental dyslexia as defined above.

Said ophthalmic device 10 comprises a frame 12 intended to be worn by the wearer 20 and a blinking illuminating element 14 coupled to the frame 12. The frame 12 is configured to be supported by the head of the wearer 20. In other words, the weight of the frame 12 is preferably fully supported by the wearer's head. The frame 12 is preferably configured to be put in front of the wearer's face.

The blinking illuminating element 14 comprises a light source 16 configured to emit light in front of the wearer's head. Particularly, said light source 16 is configured to lighten a medium 18 observed by the wearer 20. In a preferred embodiment shown on FIG. 1, said light source 16 is configured to emit light in the form of a cone 23 converging from a base 24 located in the area of the medium 18 to the wearer's head. In other words, said light source 16 is configured to fully enlighten an "A4" page (21×29.7 cm) positioned in front of the wearer's eyes at a distance of at least 40 cm. The medium 18 is for example a book observed by the wearer 20. As an alternative to only one light source 16, the blinking illuminating element 14 may comprises a plurality of light sources 16. In other words, the blinking illuminating element 14 may comprises at least one light source 16. The light source 16 is preferably a light-emitting diode (LED).

The light source 16 is configured to be successively switched on and switched off at a predetermined frequency when the blinking illuminating element is activated. In other words, the light source 16 is configured to provide a blinking light toward the medium 18 at a predetermined frequency. Said predetermined frequency is preferably at least 50 Hz, most preferably at least 70 Hz. This blinking light emitted toward the medium 18 observed by the wearer allows to improve its reading skills by reducing dyslexia effects. The ophthalmic device 20 comprises a controller (not shown) configured to successively switch on and switch off the light source 16 at the predetermined frequency. The controller may be formed by an electronic circuit coupled to the frame 12.

Said light source 16 is preferably coupled to the frame 12 so that the emitted light direction depends on the orientation of the wearer's head. Hence, when the frame 12 moves from a first to a second orientation at an angle A, the direction of the emitted light also moves from a first to a second orientation at a same angle A. The blinking illuminating element 10 thus does not require any manipulation from the wearer to efficiently point the light emitted by the light source 16.

The light source 16 may be chosen with a predetermined light emission spectrum. Hence, a specific color may be chosen for the light emitted onto the medium 18. A better color contrast of the characters written on the medium 18 may be provided to improve the reading capability of the wearer. Particularly, it allows the wearer to adapt the color contrast depending on the ambient luminosity. Furthermore, the light source 16 may be configured to selectively provide different light emission spectrums. In other words, the light color provided to the medium 18 may be changed to improve color contrast in real-time. To do so, the ophthalmic device 10 may further comprise a color selection switch comprising a plurality of positions each corresponding to a specific color of the light emitted by said light source 16. This color selection switch may be a slider button embedded on the frame 12, a single button switching from one pre-defined color to another on each press or a remote-control button.

To prevent scattering of the light emitted by the light source 16, the blinking illumination element 14 may comprise a converging lens disposed in front of said light source 16 to make the light converge toward the medium 18. As an alternative to the converging lens, the blinking illumination element 14 may further comprise a concentrating grid in front of said light source to provide a collimated light. This collimated light also allows to prevent scattering of the light emitted by the light source 16. These two solutions, converging lens and concentrating grid, allow to focus the light on the reading medium at a predetermined distance, preferably from 20 cm to 1 m. The average reading distance between a medium and the eyes is generally around 40 cm for an adult and 30 cm for a child. It allows to prevent annoyance for external viewers while increasing the efficiency of the light source 16.

A preferred embodiment of the frame 12 is shown on FIG. 2 in which the frame 12 is in the form of an eyeglasses' frame. In this preferred embodiment, the frame 12 comprises a body 26 within which the two orifices 22 are formed. Each orifice 22 is configured to receive a lens 24 therein. Particularly, the lens 24 is preferably an ophthalmic lens. By "ophthalmic lens" we mean a corrective or non-corrective lens which is suitable to be received within an orifice 22 of the frame 12. Each orifice 22 is positioned to face an eye of the wearer 20 so that each lens 24 is disposed in front of an eye of the wearer 20.

The frame 12 also comprises two arms 28 extending from the body 26 and configured to each contact a side portion of the wearer's face. Each arm 28 preferably comprises a recess configured to be received by an ear of the wearer 20 to support the frame 12.

The ophthalmic device 10 further comprises a battery embedded in one of the arms 28 to power the light source 16. More generally, one or more batteries may be embedded in each arm 28 of the frame 12. The battery also powers the controller and all electronic components embedded in or coupled to the frame 12, as for example a sensing member and a switch.

When the blinking illuminating element 14 comprises one light source 16, it is preferably disposed at a central area of the frame 12. Particularly, the light source 16 is preferably disposed in an upper portion of the frame 12 between the two orifices 22. In other words, the light source 16 is preferably disposed at an arch extending between the two orifices 22. When the blinking illuminating element 14 comprises at least two light sources 16, at least one light source 16 is disposed at a peripheral portion of the frame 12. Preferably, a light source 16 is disposed at the periphery of one among said two orifices 22. The peripheral portion preferably corresponds to a temporal side of the frame 12 at an end 29 of an arm 28. Therefore, in a configuration with two or more light sources 16, the ophthalmic device 10 preferably comprises at least one light source 16 at each side of the wearer's face.

When the frame 12 is in the form of eyeglasses, the ophthalmic device 10 forms a portative and light solution for reducing dyslexia effects of a wearer 20. Furthermore, the ophthalmic device 10 allows to reduce dyslexia effects without changing the characteristics of the lenses 24. Hence, reducing dyslexia effects and correction are achieved with separate and independent means all provided on a sole pair of eyeglasses. This allows all usual manufacturing steps (for example grinding and coating) to be made on the lenses 24 thereby providing a full ophthalmic solution.

As an alternative to the preferred embodiment of FIG. 2, the frame 12 may be of any shape allowing the light source 16 to emit light toward a medium 18 observed by the wearer 20.

The ophthalmic device 10 may further comprise a selective activating member (not shown) or activating switch configured to selectively activate the blinking illuminating element 14. The selective activating member may comprise a switch disposed onto the frame 12. In this case, the blinking illuminating element 14 may be activated on demand by the wearer. The switch is coupled to the frame 12 so that the wearer is able to press the switch to activate the blinking illuminating element 14. The switch thus provides a close activation of the light source 16.

The selective activating member may also comprise a controlling terminal configured to remotely activate the blinking illuminating element 14. This controlling terminal may be a smartphone or a computer configured to remotely activate the light source 16 using a suitable mobile application or software.

The ophthalmic device 10 may further comprise an automatic activating member comprising a sensing member configured to detect a reading situation for the wearer. The automatic activating member is also configured to activate the blinking illuminating element 14 when a reading situation is detected. For example, the sensing member may detect a posture or a movement of the wearer representative of a reading situation. To achieve this detection, the sensing member comprises one or more among an accelerometer, an eye-tracking device, a gyroscope and a telemeter to detect a movement or a position of the wearer representative of a reading setting-up of the wearer 20. The eye-tracking device may track gaze direction of the wearer to determine the reading situation by measuring eyes vergence and patterns of saccades or use specific areas of the lens known to be related to reading (such as the near vision point).

As shown on FIG. 3, the ophthalmic device may further comprise two lenses 24 coupled to the frame 12 and a color filter 30 applied to one of said two lenses 24. The color filter 30 is configured to absorb a specific light wavelength range to help the brain of the wearer to get rid of the lack of asymmetry between the two Maxwell centroids by introducing a bias in the contrast perceived by the two eyes. Said specific wavelength range is preferably between 390 nm and 790 nm, or in a more general manner between 400 nm and 800 nm.

This bias can be done by using the absence of blue cones photoreceptors in the Maxwell centroid. In this case, the color filter 30 is preferably designed to cut the light perceived by the green and red cones remaining in the Maxwell centroid. These green and red cones have an absorption peak of respectively 533 nm and 564 nm for a normal eye, i.e. a healthy subject which does not suffer from dyslexia. The blue cones have an absorption peak of 437 nm. Thus, the specific wavelength range is most preferably between 390 and 490 nm, or more generally between 400 nm and 500 nm, to fit the blue cone absorption spectrum. This most preferred range allows to set the color 30 filter with a half-width of at most 50 nm to prevent overlapping with the green cones. Thus, this blue cone absorption spectrum filter provided on one lens 24 allows to reduce red and green light for respectively red and green cones photoreceptors thereby creating an asymmetry of contrast between the two Maxwell centroids of the wearer's eyes.

The color filter 30 may be applied to an internal surface of the lens 24 intended to face the eye of the wearer 20, an external surface of the lens opposite to the internal surface or both. The color filter 30 may be a film laminated onto the lens 24.

To prevent distortion of the color perception in no-reading situations, the color filter 30 may be configured to be selectively actuated. In other words, the color filter 30 may be activated only in reading situations.

The color filter 30 fully covers the surface of the lens 24 in the embodiment of FIG. 3. Alternatively, the color filter 30 may only partly cover the surface of the lens 24 to reduce global color perception discomfort and cosmetic perception from an observer point of view. When the color filter 30 partly covers the surface of the lens 24, the color filter 30 preferably covers at most 70%, most preferably at most 60%, of the whole surface of the lens 24.

As shown on FIG. 4, said color filter 30 may be provided on the lens 24 only in a predetermined portion 32 of the lens 24. The predetermined portion is preferably a zone explored by the eye when reading. In other words, the predetermined portion 32 is chosen to be a portion scanned by the visual axis of the wearer's eye when the wearer 20 is in a reading situation. Particularly, the predetermined portion 32 is predominantly positioned between the nose of the wearer 20 and the optical center O of the eye. The predetermined portion 32 may correspond to central and near vision spots of the lens 24. The predetermined portion 32 can also be measured more accurately to provide a customized solution by using known eye-tracking device so as to measure the zone of the lens 24 used by the wearer gaze when reading. The advantage of this solution is that the color filtering can be applied on demand and limited to the useful area, preserving both cosmetic and global color perception.

According to the embodiment of FIG. 4, the predetermined portion 32 comprises an upper portion 34 extending along at most 90%, preferably at most 80%, of the width of the lens 24 along a first lens axis X. The predetermined portion 32 also comprises a lower portion 36 extending along at most 40%, preferably at most 30%, of the width of the lens 24 along the first lens axis X. The predetermined portion 32 preferably extends along at most 90% of the height of the lens 24 along a second axis Y orthogonal to the first lens axis X.

The color filter 30 might also be applied to a customized portion of the lens, depending on individual eye-head coordination during reading task.

In the embodiment of FIG. 4, the blinking illuminating element 14 comprises two light sources 16 disposed at the peripheral portion of the frame 12, i.e. at the end 29 of the arms 28.

Moreover, as an alternative to the color filter 30, a decrease in the contrast perceived by one wearer's eye may be obtained by introducing a Rx shift in one of the lenses 24. This would help the brain of the wearer to get rid of the lack of asymmetry between the two Maxwell centroids. This shift of optical power may be from 0.25 to 0.50 diopters. Preferably, the shift of optical power corresponds to a shift in cylinder of 0.25 to 0.50 diopters to reintroduce an asymmetry between the two Maxwell centroids.

This shift may be achieved by adding to a lens 24 an active system able to create an extra optical power or extra optical cylinder in the predetermined portion 32. This additional optical system may be active and linked to a battery embedded in the frame 12. The system may be also connected to a switch to make it working only on demand (when reading) or can be coupled with a sensor, like an accelerometer or an eye-tracking device, to detect reading situations and only power the system at that time. The active optical system can be an active pad with liquid crystals. This active optical system may add an optical power or cylinder of about 0.50 D when activated. This asymmetry obtained by a shift in optical power allows to provide a contrast without any filter on the lens 24 so that the ophthalmic device 10 has a better appearance for the wearer 20.

The invention also refers to a method for manufacturing an ophthalmic device 10 for reducing dyslexia effects for a wearer. The method comprises providing a frame 12 intended to be worn by the wearer 20 and a blinking illuminating element 14. Said blinking illuminating element 14 comprises at least one light source 16 configured to emit light in front of the wearer's head so as to lighten a medium 18 observed by the wearer 20. Said at least one light source 16 is configured to be successively switched on and switched off at a predetermined frequency when the blinking illuminating element 14 is activated. The method further comprises coupling the blinking illuminating element 14 to the frame 12 to obtain ophthalmic device 10.

The invention claimed is:

1. An ophthalmic device for reducing dyslexia effects for a wearer, comprising:
   a frame intended to be worn by the wearer;
   a blinking illuminating element coupled to the frame comprising at least one light source configured to emit light in front of the wearer's head to lighten a medium observed by the wearer, said at least one light source being configured to be successively switched on and switched off at a predetermined frequency when the blinking illuminating element is activated;
   two lenses coupled to the frame and configured to be each disposed in front of an eye of the wearer; and
   a color filter applied to one of said two lenses and configured to absorb a specific light wavelength range.

2. The ophthalmic device according to claim 1, further comprising a selective activating member configured to selectively activate the blinking illuminating element.

3. The ophthalmic device according to claim 2, wherein the selective activating member comprises at least one among:
   a switch disposed onto the frame and configured to activate the blinking illuminating element on demand, and
   a controlling terminal configured to remotely activate the blinking illuminating element.

4. The ophthalmic device according to claim 3, further comprising an automatic activating member comprising a sensing member configured to detect a reading situation for the wearer and to activate the blinking illuminating element when a reading situation is detected.

5. The ophthalmic device according to claim 2, further comprising an automatic activating member comprising a sensing member configured to detect a reading situation for the wearer and to activate the blinking illuminating element when a reading situation is detected.

6. The ophthalmic device according to claim 5, wherein the sensing member comprises one or more among an accelerometer, an eye-tracking device, a gyroscope and a telemeter to detect a movement or a position of the wearer representative of a reading setting-up of the wearer.

7. The ophthalmic device according to claim 1, wherein said predetermined frequency is at least 50 Hz.

8. The ophthalmic device according to claim 7, wherein said frame forms a frame of eyeglasses and defines two orifices configured to each receive a lens therein, wherein said at least one light source is disposed in an upper portion of the frame between the two orifices and/or at the periphery of one among said two orifices.

9. The ophthalmic device according to claim 7, wherein said at least one light source is configured to selectively provide different light emission spectrums.

10. The ophthalmic device according to claim 9, further comprising a color selection switch comprising a plurality of positions each corresponding to a specific color of the light emitted by said at least one light source.

11. The ophthalmic device according to claim 1, wherein said blinking illuminating element is configured to focus light emitted by said at least one light source toward the medium observed by the wearer with one among:
   a converging lens disposed in front of said at least one light source, or
   a concentrating grid in front of said at least one light source to provide a collimated light.

12. The ophthalmic device according to claim 1, wherein said color filter is configured to absorb light having a wavelength between 390 nm and 790 nm.

13. The ophthalmic device according to claim 1, wherein said color filter is applied to only a predetermined portion of the lens used by the wearer in a reading situation.

14. The ophthalmic device according to claim 1, wherein said color filter is configured to be selectively activated or deactivated according to use.

15. The ophthalmic device according to claim 1, wherein said predetermined frequency is at least 70 Hz.

16. The ophthalmic device according to claim 1, wherein said color filter is configured to absorb light having a wavelength between 390 and 490 nm.

17. A method for manufacturing an ophthalmic device for reducing dyslexia effects for a wearer, comprising:
- providing a frame intended to be worn by the wearer;
- providing a blinking illuminating element comprising at least one light source configured to emit light in front of the wearer's head so as to lighten a medium observed by the wearer, said at least one light source being configured to be successively switched on and switched off at a predetermined frequency when the blinking illuminating element is activated;
- coupling the blinking illuminating element to the frame;
- coupling two lenses to the frame, the two lenses each disposed in front of an eye of the wearer; and
- applying a color filter to one of said two lenses, the color filter absorbing a specific light wavelength range.

* * * * *